(12) United States Patent
Anderson

(10) Patent No.: US 7,007,712 B2
(45) Date of Patent: Mar. 7, 2006

(54) PNEUMATIC TOOL LOCK

(76) Inventor: Gary Anderson, 5401 Fleming St., Vancouver, British Columbia (CA) V5P 3E8

( * ) Notice: Subject to any disclaimer, the term of this patent is extended or adjusted under 35 U.S.C. 154(b) by 0 days.

(21) Appl. No.: 11/125,219

(22) Filed: May 10, 2005

(65) Prior Publication Data
US 2005/0247348 A1   Nov. 10, 2005

Related U.S. Application Data

(60) Provisional application No. 60/569,263, filed on May 10, 2004.

(51) Int. Cl.
F16K 35/00 (2006.01)
F16L 37/28 (2006.01)

(52) U.S. Cl. ............ 137/384.6; 137/383; 137/384; 251/149.6

(58) Field of Classification Search .......... 137/383, 137/384.6, 384; 173/15, 168; 251/149.6
See application file for complete search history.

(56) References Cited

U.S. PATENT DOCUMENTS

| 3,453,402 A | 7/1969 | Suber |
| 3,571,544 A | 3/1971 | Sheehan |
| 3,598,162 A | 8/1971 | Rosenthal, Jr. |
| 3,632,914 A | 1/1972 | Osika |
| 3,678,229 A | 7/1972 | Osika |
| 3,682,195 A * | 8/1972 | Cvetkovich ............ 137/384.6 |
| 3,714,383 A | 1/1973 | Leonard et al. |
| 3,816,677 A | 6/1974 | Soltez |
| 3,906,176 A | 9/1975 | Carlson |
| 3,914,563 A | 10/1975 | Prior |
| 4,107,484 A | 8/1978 | Petersen, III |
| 4,168,416 A | 9/1979 | Josemans |
| 4,230,917 A | 10/1980 | Osika |
| 4,359,615 A | 11/1982 | Meyerhoefer et al. |
| 4,463,228 A | 7/1984 | Osika |
| 4,472,952 A | 9/1984 | Hollowell, Jr. |
| 4,489,748 A * | 12/1984 | Fluetsch ............ 137/384.4 |
| 4,664,420 A | 5/1987 | Demeri |

(Continued)

FOREIGN PATENT DOCUMENTS

CA   2283552   3/2001

(Continued)

Primary Examiner—A. Michael Chambers
(74) Attorney, Agent, or Firm—Antony C. Edwards

(57) ABSTRACT

A pneumatic tool lock integral to the structure of a pneumatic tool and adapted to replace the existing male nipple component of the pneumatic tool is provided. The pneumatic tool lock includes an outer housing adapted to provide access to inner components of the pneumatic tool lock, the outer housing having a first end for securely mating with the pneumatic tool and a second end for coupling with a fluid source. An inner passageway within the outer housing provides a means for fluid to flow through from the fluid source to the pneumatic tool. A key operated lock mounted on the outer housing is displaceable between a first open position and a second closed position. A needle valve attached to the key operated lock disengageably mates with a channel extending between the inner passageway and the outer housing so as to block and un-block fluid flow into the inner passageway. When the key operated lock is displaced in the first open position, the needle valve disengages from the channel so as to allow fluid to flow into the inner passageway and when the key operated lock is displaced in the second closed position, the needle valve mates with the channel so as to inhibit fluid from flowing into the inner passageway.

9 Claims, 3 Drawing Sheets

U.S. PATENT DOCUMENTS

| | | |
|---|---|---|
| 4,705,920 A | 11/1987 | Sahrbacker |
| 4,865,557 A | 9/1989 | Kershaw |
| 5,085,043 A | 2/1992 | Hess et al. |
| 5,190,466 A | 3/1993 | McVey |
| 5,320,187 A | 6/1994 | Pressley et al. |
| 5,374,085 A | 12/1994 | Beatrice et al. |
| 5,463,196 A | 10/1995 | Darimont |
| 5,488,207 A | 1/1996 | Niwa et al. |
| 5,510,587 A | 4/1996 | Reiter |
| 5,563,586 A | 10/1996 | Baum et al. |
| 5,675,997 A | 10/1997 | Hulak |
| 5,736,837 A | 4/1998 | Noda |
| 5,990,429 A | 11/1999 | Kramer |
| 6,005,489 A | 12/1999 | Siegle et al. |
| 6,012,941 A | 1/2000 | Burdenko et al. |
| 6,049,045 A | 4/2000 | Becker et al. |
| 6,461,176 B1 | 10/2002 | Haas |
| 6,469,615 B1 | 10/2002 | Kady et al. |
| 6,706,988 B1 | 3/2004 | Helf et al. |
| 6,789,856 B1 * | 9/2004 | Bottiglieri .................... 303/89 |
| 2003/0015007 A1 | 1/2003 | Zapushek et al. |
| 2003/0062250 A1 | 4/2003 | Kraenzler et al. |
| 2003/0136652 A1 | 7/2003 | Bascom et al. |
| 2004/0020670 A1 | 2/2004 | Kusmierski et al. |
| 2005/0035659 A1 | 2/2005 | Hahn et al. |

FOREIGN PATENT DOCUMENTS

| | | |
|---|---|---|
| DE | 10029138 | 1/2002 |
| DE | 10125012 | 11/2002 |
| EP | 0674973 A1 | 10/1995 |
| FR | 2595532 | 9/1987 |
| GB | 2 048 570 | 12/1980 |
| GB | 2 353 323 | 2/2001 |
| GB | 2 358 821 | 8/2001 |
| WO | WO 97/10740 | 3/1997 |

* cited by examiner

PNEUMATIC TOOL LOCK

CROSS REFERENCE TO RELATED APPLICATION

This application claims priority from U.S. Provisional Patent Application No. 60/569,263 filed May 10, 2004 entitled Pneumatic Tool Lock.

FIELD OF THE INVENTION

The invention relates to the field of pneumatic locks, and more specifically to a locking device integrated with a pneumatic tool and thereby preventing theft or unauthorized use of the pneumatic tool.

BACKGROUND OF THE INVENTION

In the construction industry, automotive industry, assembly plants and other facilities where pneumatic tools and equipment such as nail guns and staple guns are used, it is desirable to prevent accidental or unauthorized operation of such tools and equipment, especially by children, for safety reasons. It is also desirable to prevent or inhibit theft of such tools and equipment because they can be fairly costly to replace. Furthermore, a known problem in the construction industry is inefficiency that results from the need for workers to constantly gather up their equipment, transport them to a safe storage site, and securing their tools and equipment by conventional methods whenever a construction site is left unattended. Pneumatic tools are typically secured by placing them into a locked toolbox, running cables and/or chains through the tools and securing the ends of the cable and/or chains together with a locking mechanism such as a padlock, or placing the tools in a locked storage facility. However, some pneumatic tools do not fit in conventional toolboxes or have an aperture whereby a cable and/or chain can be threaded therethrough so as to secure a locking mechanism at the ends of the cable and/or chain. Furthermore, such conventional tool locks do not prevent unauthorized use of the tool.

Applicant is aware of various means in the prior art which preclude unauthorized or accidental operation of a pneumatic tool. United States Patent Application Publication No. U.S. 2003/0015007 A1 entitled PNEUMATIC TOOL LOCK teaches a pneumatic tool lock for securing a pneumatic tool from unauthorized use or theft. The tool lock includes a housing in which a lock cylinder assembly and locking balls are disposed. The tool lock housing has an opening at one end in which a pneumatic fitting on a pneumatic tool may be inserted and secured by the engagement of the locking balls. The tool lock includes a set of raised surfaces that engage the locking balls when in the locked position, thereby preventing the locking balls from withdrawal from engagement with the pneumatic fitting. The tool lock may also include shackle portion which can be used in conjunction with a cable, either integral or separate, padlock, or chain to secure the tool lock to another object.

Applicant is also aware of U.S. Pat. No. 4,664,420 to Demeri entitled PNEUMATIC SELF-SEALING FEMALE COUPLING INCORPORATING COMBINATION LOCKING TUMBLERS which teaches a female pneumatic coupling that releasably engages a grooved nipple attachment of a pneumatic tool. The female pneumatic coupling includes a ball bearing latch that prevents removal of the grooved nipple when activated and a locking sleeve to activate the ball bearing latch. The female coupling also incorporates combination locking tumblers to prevent the unauthorized separation of the female coupling from the grooved nipple.

One difficulty with the prior art devices disclosed above is that they are generally complex and intricate, and thus expensive to manufacture and incorporate into operation with a pneumatic tool. Such devices are after-market, stand-alone additions to the pneumatic tool and are not incorporated as a component of the pneumatic tool. Furthermore, the prior art devices fail to render the tool virtually inoperable so as to prevent unauthorized use of the tool. As such, there is a need to overcome the deficiencies and inadequacies of the prior art.

SUMMARY OF THE INVENTION

It is therefore an object of the current invention to provide a means to disable a pneumatic tool and dissuade theft without resorting to locking the tool in a toolbox or other locked location, or running cables or chains combined with padlocks in and around the pneumatic tool. With the present invention, it is possible to have a locking mechanism permanently attached to the pneumatic tool that will not obstruct its use hence providing the opportunity to lock the tool at any time.

It is a further object of the present invention to provide for a locking device integral to the structure of the pneumatic tool, rather than a stand-alone device that is attached to the pneumatic tool in some way.

It is a still further object of the present invention to provide an economical means to render a pneumatic tool inoperable and whose simplicity is such that it may be incorporated into pneumatic tools by the user rather than needing to be incorporated into the pneumatic tool during manufacturing.

It is still a further object of the present invention to provide a locking device for a pneumatic tool that is designed to automatically render the tool inoperable after the expiry of a preset time period.

In summary, the pneumatic tool lock of the present invention is integral to the structure of the pneumatic tool and is adapted to replace the existing male nipple component of the pneumatic tool. The pneumatic tool lock includes an outer housing adapted to provide access to inner components of the pneumatic tool lock, the outer housing having a first end and a second end. The first end securely mates with the pneumatic tool and the second end couples with a fluid source. An inner passageway within the outer housing provides a means for the fluid to flow through from the fluid source to the pneumatic tool. A key operated lock mounted on the outer housing is displaceable between a first open position and a second closed position. A needle valve attached to the key operated lock disengageably mates with a channel extending between the inner passageway and the outer housing so as to block and un-block fluid flow into the inner passageway. When the key operated lock is displaced in the first open position, the needle valve is disengaged from the channel so as to allow the fluid to flow into the inner passageway and when the key operated lock is displaced in the second closed position, the needle valve mates with the channel so as to inhibit the fluid from flowing into the inner passageway.

The inner components of the pneumatic tool lock include in one embodiment, not intended to be limiting, a spring, a valve body, and a piston. The piston frictionally engages a first end of the spring such that when the piston displaces from a first resting position to a second open position, the piston compresses the spring against the return biasing force of the spring. The valve body defines the inner passageway and at least one aperture configured to allow the fluid to flow from the fluid source into the inner passageway.

The key operated lock may, in one embodiment, include a shaft and a plate mounted on the shaft. The shaft is rotatable in first and second opposing directions so as to displace the lock into the first open position or into the second closed position, respectively. The needle valve is mounted on the plate which displaces away from the channel when the shaft is rotated in the first direction so as to disengage the needle valve from the channel. The plate displaces towards the channel when the shaft is rotated in the second direction so as to mate the needle valve with the channel.

When the lock is displaced in the first open position, the fluid may flow through the channel into a chamber. The chamber becomes pressurized when the fluid flows through the channel and into the chamber. The pressurized chamber thereby urges the piston into the second open position to compress the spring. When said piston compresses the spring, the chamber is aligned with the least one aperture of the valve body such that the fluid may flow from the chamber into the inner passageway and into the pneumatic tool.

DETAILED DESCRIPTION OF EMBODIMENTS OF THE INVENTION

Figure 1:
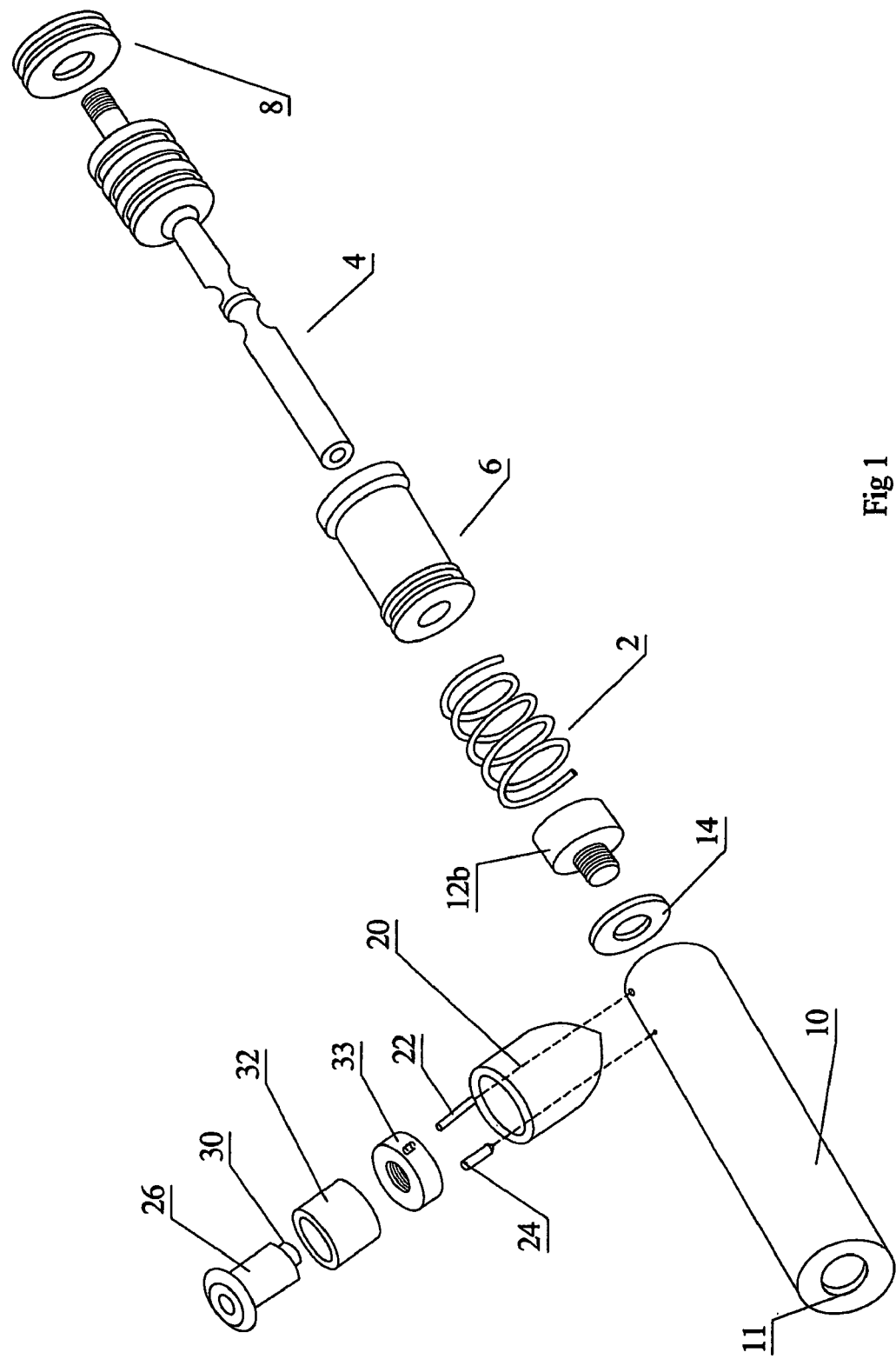
FIG. 1 is an exploded view of one embodiment of the pneumatic tool lock according to the present invention.
Figure 2:
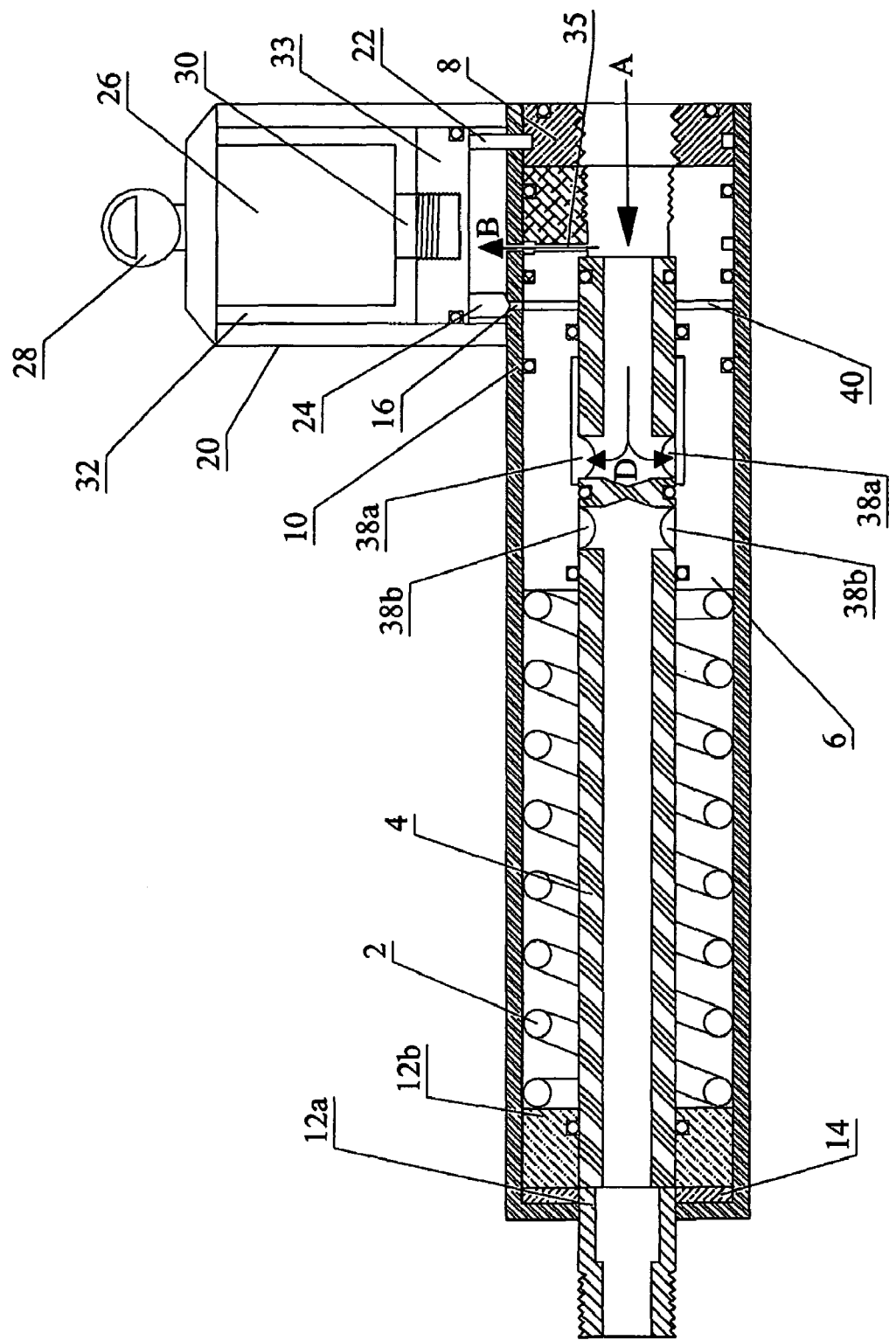
FIG. 2 is a cross sectional view of the assembled pneumatic tool lock of FIG. 1 in the closed position.

Most conventional pneumatic tools include a male air nipple adapted for quick-connect pneumatic coupling with the female component of an air hose. To attach the present invention to a pneumatic tool, the existing male air nipple of the pneumatic is, in one embodiment, first unscrewed or otherwise removed by conventional means so as to expose a receiving member to receive the pneumatic tool lock according to the present invention, as described below.

The pneumatic tool lock 1 according to the present invention includes an outer housing 10 wherein a spring 2, a hollow valve body 4, and a hollow piston 6 are disposed within housing 10. Valve body 4 has an inner passageway for air or other fluid to pass through from a fluid source, such as an air compressor, to the pneumatic tool. In an embodiment of the invention, spring 2 is a helical coil spring and valve body 4 is journalled through spring 2. Valve body 4 is also slidably journalled through piston 6 so that piston 6 is free to slide along valve body 4. Piston 6 is mounted adjacent a first end of housing 10, that is adjacent the air inlet. Spring 2 is mounted adjacent the second end of housing 10, that is adjacent the air outlet. Piston 6 is displaceable between a first resting position, abutted against the first end of the housing under the urging of spring 2, and a second open position translated towards the second end of housing 10, thereby compressing spring 2. A detachable end cap 8 may be secured to a first end of housing 10 so as to retain spring 2, valve body 4 and piston 6 within housing 10. At a second end of housing 10 is a connector member 12 configured to join, advantageously non-removably, pneumatic tool lock 1 with the pneumatic tool.

In an embodiment of the invention, connector member 12 is insertable in housing 10 such that the connector end 12*a* of connector member 12 may protrude through an aperture 11 defined at the second end of housing 10 while the body 12*b* of connector member 12 remains disposed within housing 10. Connector end 12*a* is configured to be detachably mountable with the receiving end of the pneumatic tool revealed by the removal of the tool's male air nipple component so as to connect pneumatic tool lock 1 to the pneumatic tool. In an embodiment of the invention, connector end 12*a* includes threads such as ¼ inch national pipe threads (NPT) and the receiving end of the pneumatic tool includes receiving threads corresponding to the threads of connector end 12*a* such that connector end 12*a* may be detachably secured into the receiving end of the pneumatic tool to join pneumatic tool lock 1 to the pneumatic tool. Preferably, a washer 14 is insertable in housing 10 so as to be positioned between connector body 12*b* and the inner surface of the second end of housing 10 so as to reduce friction between housing 10 and connector member 12 when housing 10 rotates about its axis around valve body 4.

A key chamber 20 is mounted on housing 10 such that a locking pin 22 and a needle valve 24 disposed within key chamber 20 may detachably mate with end cap 8 and first channel 16 on housing 10, respectively. Also disposed within key chamber 20 is a lock 26 wherein lock 26 may be displaced between a first open position and a second closed position by way of a key 28. In an embodiment of the invention, lock 26 is disposed within an inner lock housing 32. Lock 26 includes a body which defines a keyhole configured to receive key 28 and key 28 may be any conventional key capable of causing a shaft 30 of lock 26 to rotate between the first open position and the second closed position. When key 28 is rotated in a first direction, shaft 30 of lock 26 also rotates in the first direction to displace lock 26 into the first open position. When shaft 30 rotates in the first direction, shaft 30 displaces a plate 33 mounted on shaft 30 such that locking pin 22 and needle valve 24 may disengage from end cap 8 and first channel 16, respectively. In an embodiment of the invention, shaft 30 is threaded and journals through plate 33 and locking pin 22 and needle valve 24 are both mounted on an underside of plate 33. As such, when shaft 30 is rotated in the first direction, plate 33 displaces upwards away from housing 10 such that locking pin 22 and needle valve 24 disengages from end cap 8 and first channel 16, respectively. When key 28 is rotated in a second opposing direction, shaft 30 of lock 26 also rotates in the second opposing direction to displace lock 26 into the second closed position. When shaft 30 rotates in the second opposing direction, shaft 30 displaces plate 33 downwards towards housing 10 such that locking pin 22 and needle valve 24 re-engages with end cap 8 and first channel 16, respectively.

In an embodiment of the invention, to attach pneumatic tool lock 1 to the pneumatic tool, spring 2, valve body 4, and piston 6 are removed from the hollow interior of housing 10 by inserting key 28 into the keyhole of lock 26 and rotating key 28 so as to displace lock 26 into the first open position. By displacing lock 26 into the first open position, locking pin 22 and needle valve 10 may disengage from end cap 8 and first channel 16, respectively. End cap 8 may then be removed from the first end of housing 10 such that spring 2, valve body 4, and piston 6 may be withdrawn from the hollow interior of housing 10. In an embodiment of the invention, end cap 8 includes receiving threads, such as ¼ inch NPT receiving threads which correspond with the threads, such as ¼ inch NPT threads of a first end of valve body 4. As such, end cap 8 may be detachably secured onto the first threaded end of valve body 4.

By grasping on to the first threaded end of valve body 4, spring 2, valve body 4, and piston 6 may be slidably removed from the hollow interior of housing 10. Connector end 12a of connector member 12 may then be attached to the pneumatic tool by mating threaded connector end 12a with the corresponding threaded aperture in the pneumatic tool revealed by the removal of the tool's male nipple component A second key, such as a hex key, may be inserted in the hollow interior of housing 10 so as to tighten or otherwise secure connector end 12a into the receiving end of the pneumatic tool. Once connector member 12 has been secured onto the pneumatic tool, spring 2, valve body 4, and piston 6 may be slidably re-inserted and secured within the hollow interior of housing 10 by re-securing end cap 8 onto the first threaded end of valve 4. End cap 8 thus need only be removed when installing or detaching the pneumatic tool lock from a tool. Key 28 may then be rotated so as to displace lock 26 into the second closed position and removed from the keyhole of lock 26. By displacing lock 26 into the second closed position, locking pin 22 and needle valve 10 may re-engage from end cap 8 and first channel 16, respectively. Pneumatic tool lock 1 is now securely and virtually permanently attached to the pneumatic tool. Pneumatic tool is also virtually inoperable when lock 26 is in the second closed position. In one embodiment of the invention, when lock 26 is in the second closed position, needle valve 24 engages and mates with first channel 16 such that air or any other fluid source the pneumatic tool may operate on may not pressurize chamber 40. Chamber 40 needs to be pressurized in order to displace piston 6 to an open position so as to allow air to flow into valve body 4 and into the pneumatic tool. The pneumatic tool is therefore rendered useless when pneumatic tool lock 1 is installed.

Figure 3:
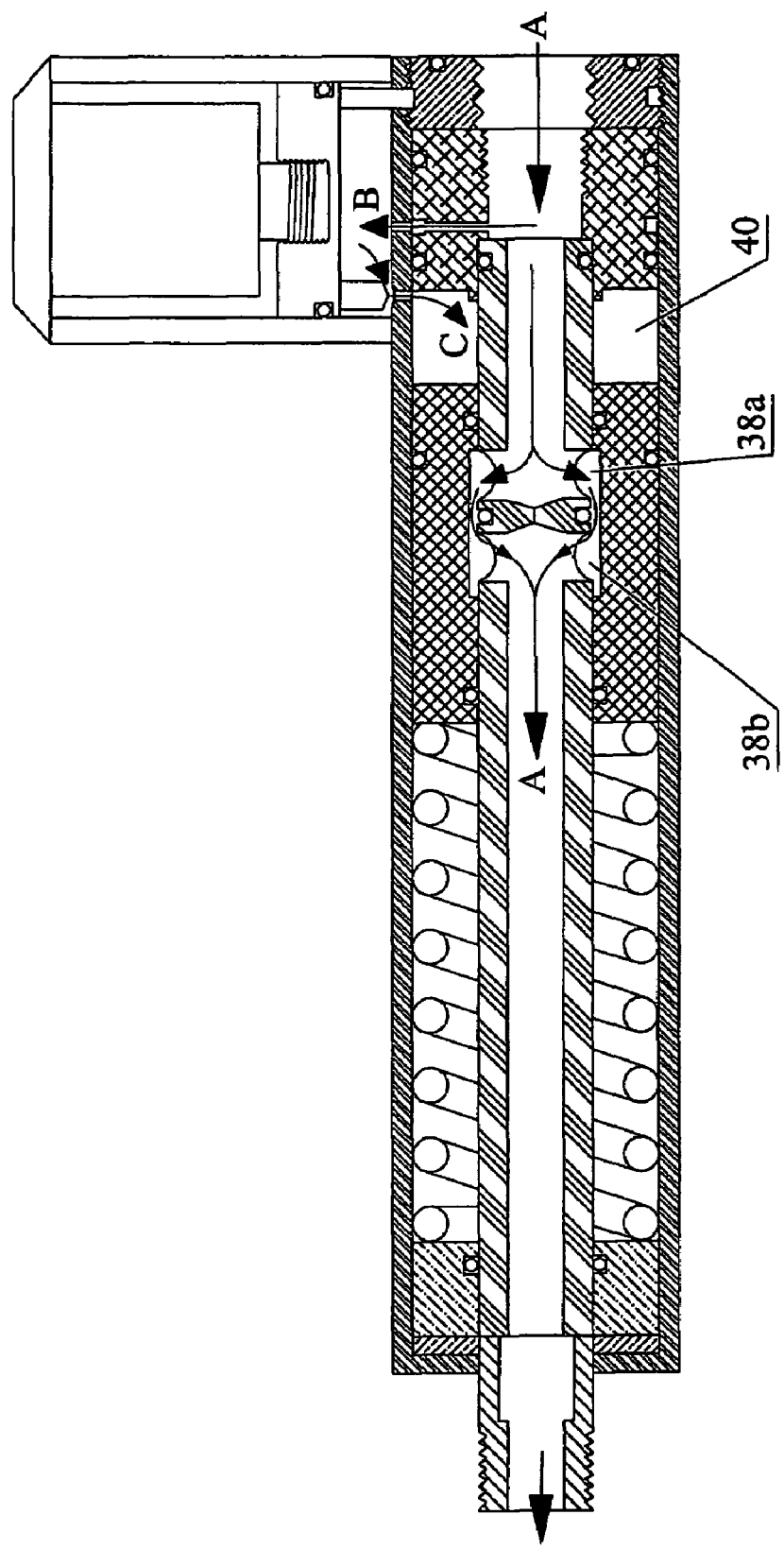
FIG. 3 is a cross sectional view of FIG. 2 with the valve in the open position.

To allow air to pass through the inner passageway of valve body 4 and into the pneumatic tool so as to render the pneumatic tool operable, key 28 is inserted in the keyhole of lock 26 to rotate lock 26 into the first open position. A coupler may then be secured onto the first threaded end of end cap 8. The coupler enables an air compressor or any other fluid source to be attached to pneumatic tool lock 1. When air enters the pneumatic tool lock 1 via valve body 4 in direction A, a portion of the air flows through second channel 35 in direction B. Because lock 26 is in the first open position, needle valve 24 is disengaged from first channel 16 such that air flowing through second channel 35 in direction B may flow through first channel 16 in direction C as seen in FIG. 3, thereby directing air into chamber 40. In an embodiment of the invention, piston 6 is positioned adjacent to chamber 40 such that as chamber 40 becomes pressurized by the air flowing in direction C, the pressure forces piston 6 to displace from the first resting position to the second open position towards the second end of housing 10, thereby compressing spring 2. When piston 6 is in the second open position, air flowing in through the inlet in direction A is in fluid communication with both apertures 38a and 38b of valve body 4. As such, air flows through the annular grooves and into the inner passageway of valve body 4 in direction A' to direct air to the pneumatic tool. Leakage of air past the seals of the o-rings determines how long piston 6 remains in the second open position before being biased into the closed position by spring 2.

To terminate the air flow to the pneumatic tool, key 28 is rotated in the second opposing direction to rotate lock 26 into the second closed position. Needle valve 24 thereby re-engages channel 16 and air is prevented from flowing through channel 16 into chamber 40 to pressurize chamber 40 to displace piston 6 from the first resting position to the second open position. Air will continue flowing through valve body 4 to the pneumatic tool until sufficient air has leaked out such that the pressure in chamber 40 is no longer sufficient to maintain piston 6 in the second open position to compress spring 2. Gradually, piston 6 will return to the first resting position, decompressing spring 2 and terminating the flow of air through apertures 38a and 38b and into valve body 4. The air source may then be removed.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A pneumatic tool lock for mounting, so as to be integral to, the structure of a pneumatic tool, the pneumatic tool lock comprising:

(a) an outer housing having mounting means adapted to replace the existing male nipple component of the pneumatic tool, said outer casing having a first end and a second end, said first end for securely mating with the pneumatic tool, said second end for releasable coupling with a pneumatic fluid source;

(b) an inner passageway within said outer housing, said inner passageway providing a means for a fluid from said fluid source to flow through to the pneumatic tool;

(c) a key operated lock mounted on said outer housing, said lock displaceable between a first open position and a second closed position;

(d) a channel extending between said inner passageway and through said outer housing; and (e) a needle valve mounted in cooperation with said key operated lock, said needle valve disengageably mating with said channel to block and un-block flow of said fluid into a first chamber in said inner passageway;

(f) a shuttle valve slidably mounted in said inner passageway adjacent said second end, (g) resilient biasing means mounted in said inner passageway adjacent said first end and resiliently biasing said shuttle valve against said second end, wherein when said key operated lock is displaced in said first open position, said needle valve is disengaged from said channel so as to allow said fluid to flow into said first chamber of said inner passageway thereby shuttling said shuttle valve into an open position permitting fluid flow from second end to said first end to operate the tool; and wherein when said key operated lock is displaced in said second closed position, said needle valve mates with said channel so as to inhibit said fluid from flowing into said first chamber of said inner passageway to thereby allow said biasing means to resiliently urge said shuttle valve into a closed position.

2. The pneumatic tool lock of claim 1 wherein said inner components comprise a spring, a valve body, and a piston.

3. The pneumatic tool lock of claim 2 wherein said piston frictionally engages a first end of said spring, said piston displaceable between a first resting position and a second open position, said piston compressing said spring when in said second open position.

4. The pneumatic tool lock of claim 3 wherein said valve body defines said inner passageway, said valve body further defining at least one aperture configured to allow said fluid to flow into said first chamber of said inner passageway.

5. The pneumatic tool lock of claim 4 wherein said key operated lock comprises a shaft and a plate mounted on said shaft, said shaft rotatable in a first and a second opposing direction so as to displace said lock in said first open position and said second closed position, respectively.

6. The pneumatic tool lock of claim 5 wherein said needle valve is mounted on said plate, said plate displaceable away from said channel when said shaft is rotated in said first direction so as to disengage said needle valve from said channel and said plate displaceable towards said channel when said shaft is rotated in said second direction so as to mate said needle valve with said channel.

7. The pneumatic tool lock of claim 6 wherein when said lock is displaced in said first open position, said fluid may flow through said channel into said first chamber.

8. The pneumatic tool lock of claim 7 wherein said first chamber becomes pressurized when said fluid flows through said channel said chamber thereby forcing said piston to compress said spring.

9. The pneumatic tool lock of claim 8 wherein when said piston compresses said spring, said channels in said shuttle valve are aligned with an airway of said valve body such that said fluid may flow along the length of said inner passageway.

* * * * *